United States Patent
Anderson et al.

(10) Patent No.: US 8,205,180 B1
(45) Date of Patent: Jun. 19, 2012

(54) METHOD OF AND SYSTEM FOR GENERATING A LOGIC CONFIGURATION FOR AN INTEGRATED CIRCUIT

(75) Inventors: Jason H. Anderson, Toronto (CA); Qiang Wang, Campbell, CA (US)

(73) Assignee: Xilinx, Inc., San Jose, CA (US)

( * ) Notice: Subject to any disclaimer, the term of this patent is extended or adjusted under 35 U.S.C. 154(b) by 245 days.

(21) Appl. No.: 12/435,886

(22) Filed: May 5, 2009

(51) Int. Cl.
 *G06F 9/455* (2006.01)
 *G06F 17/50* (2006.01)

(52) U.S. Cl. ......... 716/113; 716/108; 716/118; 716/117

(58) Field of Classification Search .................. 716/118, 716/119, 117, 113, 108
See application file for complete search history.

(56) References Cited

U.S. PATENT DOCUMENTS

| | | | |
|---|---|---|---|
| 6,222,757 B1 * | 4/2001 | Rau et al. ....................... | 365/154 |
| 7,312,631 B1 * | 12/2007 | Bauer et al. ..................... | 326/38 |
| 7,376,000 B1 * | 5/2008 | Voogel et al. .................. | 365/149 |
| 7,543,258 B2 * | 6/2009 | Kitahara et al. ............... | 716/113 |
| 7,739,641 B1 * | 6/2010 | Barnes ........................... | 716/113 |
| 2005/0134353 A1 * | 6/2005 | Tahara ........................... | 327/295 |
| 2006/0053403 A1 * | 3/2006 | Cowan et al. .................. | 716/13 |

OTHER PUBLICATIONS

XILINX, Inc., *ISE In-Depth Tutorial 10.1*, May 30, 2008, 168 pp., available from Xilinx, Inc., San Jose, CA, USA.

* cited by examiner

*Primary Examiner* — Nghia Doan
*Assistant Examiner* — Brian Ngo
(74) *Attorney, Agent, or Firm* — John J. King (57) ABSTRACT

A method of placing a circuit design in logic blocks of an integrated circuit is disclosed. The method comprises receiving a circuit design to be implemented in the logic blocks of the integrated circuit; determining clock skew for a clock tree providing clock signals to a plurality of memory elements of the integrated circuit; evaluating timing requirements associated with the circuit design; and transforming the circuit design to a placement configuration, wherein the placement configuration places the circuit design in the logic blocks of the integrated circuit according to the timing requirements of the circuit design and the clock skew for the clock tree.

16 Claims, 5 Drawing Sheets

METHOD OF AND SYSTEM FOR GENERATING A LOGIC CONFIGURATION FOR AN INTEGRATED CIRCUIT

FIELD OF THE INVENTION

The present invention relates generally to integrated circuits, and in particular, to a method of and system for generating a logic configuration for an integrated circuit.

BACKGROUND OF THE INVENTION

Signals in digital circuits typically have one driver pin and one or more load pins. A logic transition on a signal during circuit operation commences at the driver of the signal and is received by each of the load pins at some point later in time. The propagation delay from a signal driver to each of its load pins depends on the routing topology, capacitance, and buffering in the signal path. For a multi-load signal, the propagation delay from the signal driver to each load may differ. This notion leads to an important signal property, called the signal "skew," which is the difference in propagation delay of a signal routed to the different load pins. Similarly, "clock skew" refers to skew on the clock network. Clock skew has a considerable impact on the performance of sequential logic circuits, and can often reduce the performance of sequential circuits by reducing the permissible propagation time for combinational paths.

SUMMARY OF THE INVENTION

A method of placing a circuit design in logic blocks of an integrated circuit is disclosed. The method comprises receiving a circuit design to be implemented in the logic blocks of the integrated circuit; determining clock skew for a clock tree providing clock signals to a plurality of memory elements of the integrated circuit; evaluating timing requirements associated with the circuit design; and transforming the circuit design to a placement configuration, wherein the placement configuration places the circuit design in the logic blocks of the integrated circuit according to the timing requirements associated with the circuit design and the clock skew for the clock tree. The method may further comprise generating delay estimates associated with the logic blocks of the integrated circuit, and modifying the delay estimates based upon the clock skew for the clock tree. Determining clock skew for a clock tree may comprise determining a first delay of a clock signal to a first memory element and a second delay of the clock signal to a second memory element. Further, transforming the circuit design to a placement configuration may further comprise selecting portions of a circuit design placed between the first memory element and the second memory element based upon the first delay of the clock signal to the first memory element and the second delay of the clock signal to the second memory element. Evaluating timing requirements associated with the circuit design may comprise identifying a portion of the circuit design having a restrictive timing requirement. The method may further comprise placing the portion of the circuit having the restrictive timing requirement between memory elements having increased clock performance.

A computer program product comprising a computer-readable medium having computer-readable program code that transforms a circuit design to a placement configuration is also disclosed. The computer-readable medium comprises computer-readable program code that receives a circuit design to be implemented in the logic blocks of the integrated circuit; computer-readable program code that determines clock skew for a clock tree providing clock signals to a plurality of memory elements of the integrated circuit; computer-readable program code that evaluates timing requirements associated with the circuit design; and computer-readable program code that transforms the circuit design to a placement configuration, wherein the placement configuration places the circuit design in logic blocks of the integrated circuit according to the timing requirements associated with the circuit design and the clock skew for the clock tree. The computer program product may further comprise computer-readable program code that generates delay estimates associated with the logic blocks of the integrated circuit. The computer program product may further comprise computer-readable program code that modifies the delay estimates based upon the clock skew for the clock tree. The computer program product may further comprise computer-readable program code that determines a first delay of a clock signal to a first memory element and a second delay of the clock signal to a second memory element. The computer program product may further comprise computer-readable program code that selects portions of a circuit design placed between the first memory element and the second memory element based upon the first delay of the clock signal to the first memory element and the second delay of the clock signal to the second memory element. The computer program product may further comprise computer-readable program code that identifies a portion of the circuit design having a restrictive timing requirement. The computer program product may further comprise computer-readable program code that places the portion of the circuit having the restrictive timing requirement placed between memory elements having improved clock performance.

Finally, a system for placing a circuit design in logic blocks of an integrated circuit is also disclosed. The system comprises an input coupled to receive a circuit design to be implemented in the logic blocks of the integrated circuit; a control circuit coupled to transform the circuit design to a placement configuration, wherein the placement configuration places the circuit design in the logic blocks of the integrated circuit according to timing requirements of portions of the circuit design and clock skew associated with the clock tree coupled to registers of the integrated circuit; and an output coupled to receive the placement configuration. The placement configuration may comprise the placement of lookup tables and interconnect elements between the registers of the integrated circuit. The system may further comprise a first table storing delay estimates associated with the logic blocks of the integrated circuit. The system may further comprise a second table storing modified delay estimates associated with the logic blocks of the integrated circuits. The system may further comprise a memory coupled to receive the output data. The system may further comprise a device having programmable logic coupled to receive the output data.

DETAILED DESCRIPTION

Figure 1:
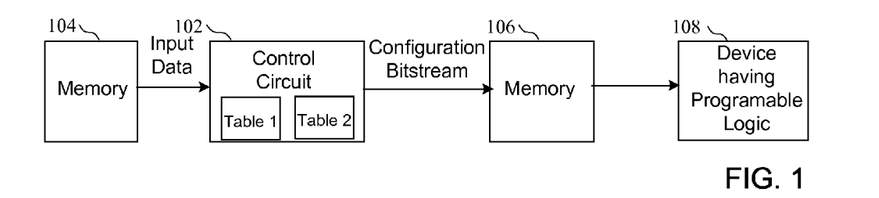
FIG. 1 is a block diagram of a system for implementing a device having programmable logic according to an embodiment the present invention.

Turning first to FIG. 1, a block diagram of a system for implementing a device having programmable logic according to an embodiment the present invention is shown. In particular, a control circuit 102 is coupled to receive input data from a memory 104, and generate a configuration bitstream which is stored in a memory 106 (for example, memory 106 can be comprised of multiple memory elements such as, e.g., memory cells). As will be described in more detail below, the input data may comprise a circuit design defined in a high definition language (HDL) such as VHDL, for example. The control circuit generates a configuration bitstream which is stored in a memory 106. As will be described in more detail below, the configuration bitstream comprises a placement configuration which provides information related to the placement of elements of a circuit design in programmable logic of the device. Memory 106 comprises a non-volatile memory for storing the configuration bitstream that may be loaded into an integrated circuit device having programmable logic 108. As will be described in more detail below, the control circuit 102 generates a configuration bitstream having an optimized placement of components which takes into account clock skew during placement.

The software flow for the design of a device having programmable logic comprises synthesis, packing, placement and routing, as is well known in the art. Synthesis comprises the step of converting a circuit design in a high level language to a configuration of elements of the programmable logic. For example, portions of a circuit design implementing certain functions may be implemented in configurable logic blocks (CLBs), as will be described in more detail below. Packing comprises the step of grouping portions of the circuit design into defined blocks of the device, such as configurable logic blocks. Placing comprises the step of determining the location of the blocks defined during the packing step, wherein the logic blocks in a design are placed on a two-dimensional grid associated with the device. Placement is performed by a placer, which may comprise placement software running on a computer, or a portion of a larger software package running on a computer for implementing the circuit design in the device. Finally, routing comprises selecting paths of interconnect elements, such as programmable interconnects in a device having programmable logic. The task of generating a circuit layout which meets timing requirements is accomplished by adjusting the placement of the blocks and routing between the blocks if timing requirements are not met or timing performance of the circuit could be improved.

Placement is a key phase of the design flow. Because it requires too much computation to perform routing for each placement considered by the placer, the placer will rely on estimates of connection delays of a design, rather than actual connection delays. Delay estimation during placement is well known in the art. For example, a delay estimator associated with a placer could use a pre-computed table of delays, such as table 1 of the control circuit 102, to estimate signal delay between elements of the device. According to an embodiment of the present invention, the delay estimator receives a signal source pin and a signal load pin as inputs, and it returns a delay from the table corresponding to the estimated routing delay between the source and load connections. As will be described in more detail below, the methods of the present invention enable optimizing the placement of the circuit by taking clock skew into account when determining delay estimates associated with source and load connections of the circuit design placed in elements of the device. According to one aspect of the invention, modified delay estimates may be generated based upon clock skew, where the modified estimates may be stored in another table, such as table 2 of the control circuit.

Figure 2:
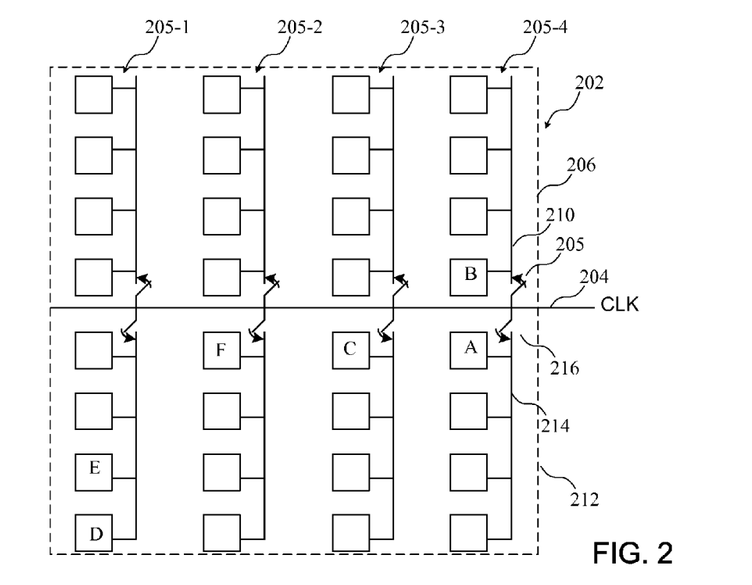
FIG. 2 is a block diagram of a device having programmable logic and a clock tree routing clock signals according to an embodiment of the present invention.

Turning now to FIG. 2, a block diagram of a clock region 202 of a device having programmable logic and a clock tree which routes clock signals according to an embodiment of the present invention is shown. As shown, a clock signal (CLK) first enters the region on one side and travels along a horizontal clock row 204. At the intersection of each column of logic blocks 205, shown here as columns 205-1 through 205-4, the clock may be programmably connected using switches to one of a plurality of vertical branches traveling either up and/or down from the horizontal clock row and spanning half of the height of the clock region. FIG. 2 comprises flip-flops, commonly called registers, as a type of memory element by way of example. However, it should be understood that other types of memory elements such as, e.g., memory cells may be employed according to embodiments of the present invention. Data signals must generally be available at the input of the memory element before the clock signal arrives at the memory element. Therefore, taking clock skew into account is an important aspect of correctly estimating the propagation delays of signal paths. As is apparent in the routing structure of FIG. 2, clock signals routed on the clock tree will exhibit skew. For example, a clock signal transition will clearly arrive at flip-flops A and B earlier than it will arrive at flip-flops C and D. However, it is unclear whether a clock transition will arrive at flip-flop E earlier than it will arrive at flip-flop F. The timing to flip-flops E and F would depend on detailed device characterization data. As will be described in more detail below, clock skew is modeled during the placement phase of implementing a circuit in the device and used for performance improvement.

Figure 3:
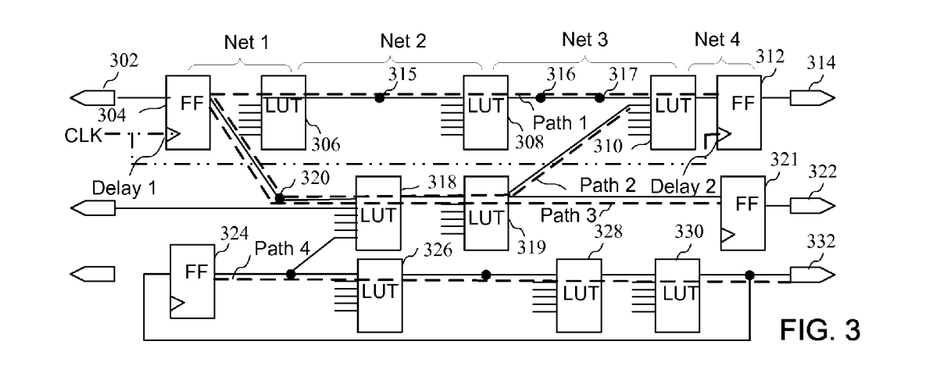
FIG. 3 is a block diagram of a device having registers coupled to receive data signals and clock signals according to an embodiment of the present invention.

Turning now to FIG. 3, a block diagram of a device having flip-flops coupled to receive data signals and clock signals according to an embodiment of the present invention is shown. In particular, FIG. 3 shows various nets and paths between flip-flops. As will be described in more detail below, the delay estimates may be based upon nets or paths, for example. A net represents a collection of interconnect segments from the output of a user logic block such as a lookup table to inputs of the next destination user logic block, while a path represents a sequence of nets between flip-flops comprising a connection from a source flip-flop to a load flip-flop. A path may be defined as a clock-to-clock path, such as a path from one flip-flop to another flip-flop, a flip-flop to an output, an input to a flip-flop, or an input to an output, as is well known in the art. While FIG. 3 is shown in terms of lookup tables, it should be understood that other logic blocks may be used, such as those logic blocks defined in more detail in reference to FIG. 4.

FIG. 3 shows various arrangements of flip-flops and LUTs. An input/output (I/O) port 302, which may comprise an input for receiving data, is coupled to an input of a flip-flop 304, shown here as a flip-flop (FF), the output of which is coupled to an input of a LUT 306. Some inputs of LUTs and flip-flops in FIG. 3 are shown without nets attached. These nets may connect to other nets, LUTs or flip-flops, but are omitted for clarity. The output of the LUT 306 is coupled to a second LUT 308, the output of which is coupled to a third LUT 310. The output of the LUT 310 is coupled to a flip-flop 312 which is coupled to an I/O port 314.

By way of example, there are 4 nets associated with a Path 1 which extends from flip-flop 304 to flip-flop 312 by way of LUT 306, LUT 308 and LUT 310. Also shown by way of example, a first net (Net1) is defined between flip-flop 304 and the LUT 306. A second net (Net 2) is defined between LUT 306 and LUT 308, and comprises one interconnect point 315 connecting two interconnect segments. The interconnect point may comprise a programmable interconnect point (PIP). For example, the interconnect point could comprise a programmable multiplexing network similar to the multiplexing network 620A of FIG. 6 described below, or some other suitable multiplexing network. In contrast, a third net (Net3) extending from the LUT 308 to the LUT 310 comprises two interconnect points 316 and 317 connecting interconnect segments. Finally, a fourth net is defined between the LUT 310 and the flip-flop 312.

A second path, Path 2, between the flip-flop 304 and the flip-flop 312 is shown extending through LUTs 318 and 319 by way of an interconnect point 320, and back to LUT 310. While Path 1 and Path 2 have the same number of LUTs between the same flip-flops, they extend through different LUTs and interconnect points. A third path, Path 3, extends from flip-flop 304, through LUTs 318 and 319 to a flip-flop 321, the output of which is coupled to an I/O port 322. The output of a flip-flop 324 is coupled by way of LUTs 326-330 to an I/O port 332, as shown by Path 4. A feedback loop is also shown, which would be considered a separate path. The interconnect multiplexers of FIG. 6 described in more detail below may be used as interconnect points to provide input flexibility between a general interconnect structure and configurable logic elements in FIG. 3. As described above, the connection from the output of one LUT to the input of another LUT may be established by a number of different nets which may comprise different delays. While nets may be selected to meet a minimum delay, multiple resources may compete for the same resources, making efforts to meet a delay requirement challenging.

Clock skew has a considerable impact on the performance of sequential logic circuits, and may reduce the performance of sequential circuits by reducing the permissible propagation time for combinational paths. While the interconnect multiplexers enable selecting nets to meet timing constraints of the circuit, the delays associated with various nets or paths are modified based upon clock skew. According to one aspect of the invention, the placer is made aware of clock skew without any change to the operation of the placer, thereby achieving performance benefits with minimized effort and cost. A clock signal is coupled to each of the flip-flops, as is well known in the art. In the circuit of FIG. 3, the clock signal CLK is shown coupled to flip-flops 304 and 314, where the clock signal reaches flip-flop 304 after a first delay, Delay 1, and reaches flip-flop 312 after a second delay, Delay 2. Delay 1 and Delay 2 may be different, and therefore leads to a relative delay difference which impacts the allowable propagation time of a data signal routed between the flip-flops. Accordingly, the estimated delay for routing a data signal between the flip-flops is modified based upon the clock skew to provide a more accurate delay estimate. This more accurate delay estimate may be used to improve the placement of the circuit by taking into account paths which have increased or decreased timing constraints as a result of clock skew.

Before describing the modified delay estimates, the affect of clock skew on circuit performance is described. The clock signal may be coupled to two load flip-flops coupled by a combinational path between the flip-flops. If the clock period is 10 ns, the allowable propagation time for a combinational path, such as Path 1 between the flip-flops, is 10 ns minus the set-up time of flip-flop 312 in the absence of clock skew in order to allow the data to be present at the input of the flip-flop before the clock signal arrives at the flip-flop. Assuming that the clock signal propagation time to flip-flop 312 is 2 ns and the clock signal propagation time to flip-flop 304 is 3 ns, the clock skew is 1 ns. However, the clock skew in this example negatively impacts the allowable propagation time of a data signal transmitted on for Path 1, reducing the allowable propagation time to 9 ns and leading to a decreased clock performance. In contrast, clock skew may lead to improved clock performance under other circumstances. For example, if the clock signal arrives 1 ns later at flip-flop 312 than at flip-flop 304, the clock skew is still 1 ns, but the permissible propagation time for a data signal transmitted on Path 1 is increased to 11 ns. In this case, skew makes it easier to meet the performance constraint.

Based on the stored delay estimates, timing analysis is performed to determine a timing slack value for each connection in the design. For example, in addition to storing a delay estimate for Path 1 of the interconnect segments associated with Path 1, the control circuit will also estimate the clock skew for the path. The placer optimizes the design based on the timing slacks. In particular, connections with negative slack (i.e. when the estimated delay is greater than the allowed propagation time) are not meeting design constraints, and the placer aims to reduce the delays of such connections. On the other hand, when there is competition for the paths having the best delays, then the connections with positive slack (i.e. when the estimated delay is less than the allowed propagation time) are already meeting design constraints, and can perhaps be routed through alternative paths that experience longer delays, if needed, to allow for an improvement in negative slack connections.

According to one aspect of the invention, the determination of the clock skew enables accounting for the clock skew as offsets in the delay estimates in the combinational paths covered by the clock. By taking clock skew into account, the modified delay estimates more accurately reflect the actual delay between flip-flops, and therefore lead to better performance. That is, the delay estimates are provided as if there is no clock skew and the clock signals arrive to all flip-flops at the same time. There are two cases of clock skew to consider. In a first case, if the clock skew is such that the permissible delay of a combinational path between two flip-flops is increased, then the estimated delays of the connection on that combinational path is "artificially" decreased by offsets to more accurately reflect the actual time available for a data signal to travel between the two flip-flops on that combinatorial path. Because the clock skew in this case provides more time for the signal to arrive, the estimated delays for the individual segments associated with the path may be reduced when defined in terms of a clock having no skew. Accordingly, the modified delay time will more accurately define the path where the data on the path will actually take longer than the modified estimated delay, and the clock skew in that path will enable that longer time. That is, the modified delay estimates provide the delay in terns of a clock having no skew, although actual delays may be greater, and those greater delays will be allowed by the clock skew in the path.

In a second case, if the clock skew is such that the permissible delay of a combinational path between flip-flops is reduced, then the delay of the connections on that combinational path is "artificially" increased to more accurately reflect the actual time available for a data signal to travel between the two flip-flops on that combinatorial path if there were no clock skew. Similarly, because the clock skew in the second case provides less time for the signal to arrive, the estimated delays for the individual segments associated with the path is increased. Accordingly, the modified delay time will more accurately define the path where the data on the path will actually take less time than the modified estimated delay. That is, the data will need to take less time because of the clock skew.

Accordingly, skew is modeled in the estimated delays of connections on combinational paths, and not in the clock signal delays. That is, the estimated delays are based upon both delays in the combinatorial path and clock skew. The placer will "see" longer connection delays when it places flip-flops in positions that have negative performance consequences due to clock skew. Conversely, the placer will "see" shorter connection delays when it places flip-flops in positions that have positive performance consequences. The modified estimates will lead to better overall design performance when placing a circuit design in a device.

One benefit of the present invention is that it is easily integrated into any existing configuration tool. The placer may be implemented as it is normally implemented because only the delay estimate data on which the placer depends is changed. By accounting for clock skew in the delays of connections, the placer is made aware of clock skew without any change to the placer flow or underlying operation of the placer. This is advantageous from the viewpoints of engineering effort and code stability/maintainability. An example of a placer may be found in ISE software tools available from Xilinx, Inc, of San Jose, Calif.

There are various ways in which connection delays between two flip-flops can be adjusted to account for clock skew. In FIG. 3, Path 1 has 4 connections between two flip-flops. Accordingly, the modification of the delay time may be spread out over the 4 connections. For example, if skew permits the combinational path delay to be increased by 2 ns, the delays of each of the nets may be decreased by 0.5 ns, where the skew benefit is divided equally among the nets. Alternatively, the skew benefit may be allocated more to one net versus the other nets. For example, 1 ns could be allocated to net 1 and 0.5 ns could be allocated to each to nets 2 and 3.

It is also important to recognize that any connection may have more than one flip-flop in its fanin cone and likewise, it may have more than one flip-flop in its fanout cone. In such a case, the skew between the various fanin/fanout flip-flop pairs needs to be considered in determining the delay adjustment for the connection. When the placer moves a flip-flop, all of the connections in the fanin or fanout cones of that flip-flop are "tweaked" to account for skew changes. The delay tweaks to account for skew may only occur from time-to-time during the placement process, which may be advantageous from the run-time perspective, at the expense of the timing quality of he placement. While the embodiment of FIG. 3 is provided by way of example to show nets and paths in programmable logic of a programmable logic device, it should be understood that nets may include many additional interconnect segments and interconnect points, while paths may include many additional LUTs and flip-flops.

Figure 4:
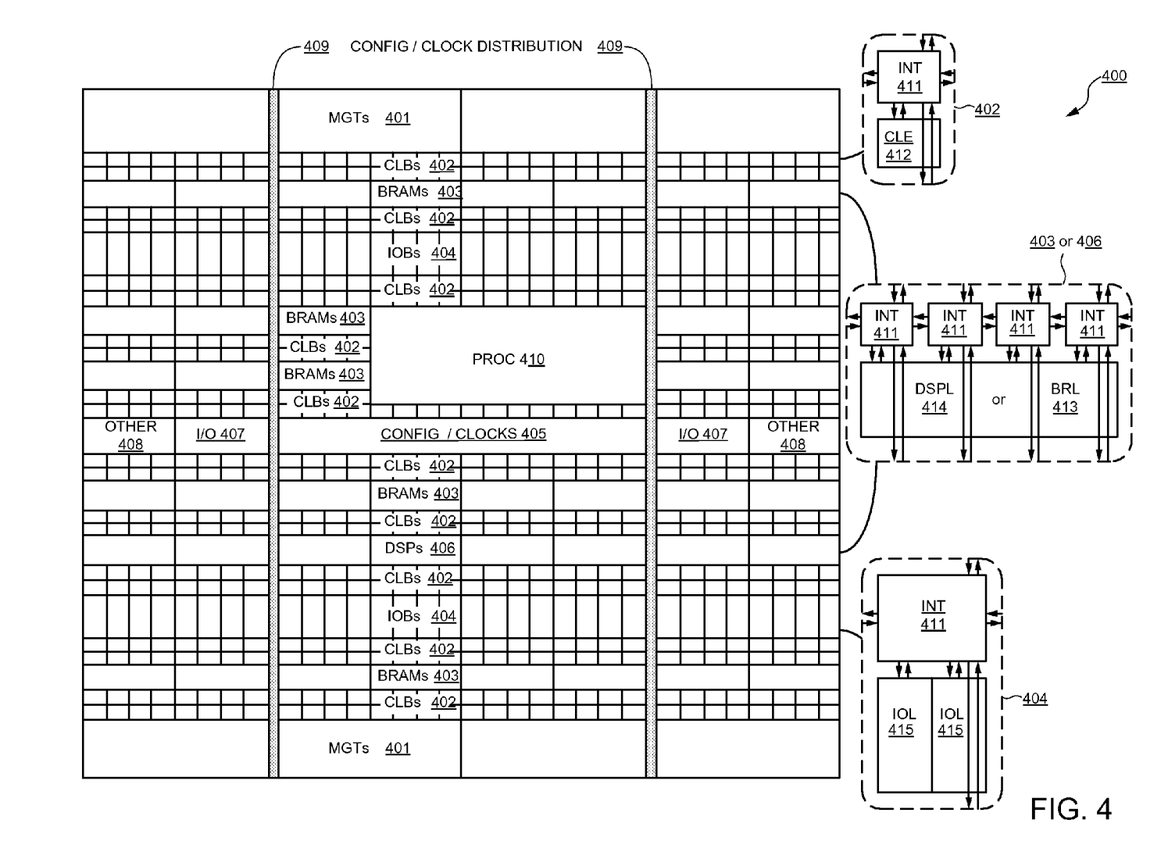
FIG. 4 is a block diagram of a device having programmable logic according to an embodiment of the present invention.

Turning now to FIG. 4, a block diagram of a device having programmable logic according to an embodiment of the present invention is shown. The circuits and methods of the present invention as described above with respect to FIG. 3 may be implemented in the circuit of FIG. 4 While devices having programmable logic may be implemented in any type of integrated circuit device, such as an application specific integrated circuit (ASIC) having programmable logic, other devices comprise dedicated programmable logic devices. A programmable logic device (PLD) is an integrated circuit device designed to be user-programmable so that users may implement logic designs of their choices. One type of PLD is the Complex Programmable Logic Device (CPLD). A CPLD includes two or more "function blocks" connected together and to input/output (I/O) resources by an interconnect switch matrix. Each function block of the CPLD includes a two-level AND/OR structure similar to that used in a Programmable Logic Array (PLA) or a Programmable Array Logic (PAL) device. Another type of PLD is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. These CLBs, IOBs, and programmable routing resources are customized by loading a configuration bitstream, typically from off-chip memory, into configuration memory cells of the FPGA. For both of these types of programmable logic devices, the functionality of the device is controlled by configuration data bits of a configuration bitstream provided to the device for that purpose. The configuration bitstream comprises information related to the placement of blocks, and therefore comprises a placement configuration for the circuit implemented in a particular device. The configuration data bits may be stored in volatile memory (e.g., static memory cells, as in FPGAs and some CPLDs), in non-volatile memory (e.g., flash memory, as in some CPLDs), or in any other type of memory cell.

The device of FIG. 4 comprises an FPGA architecture 400 having a large number of different programmable tiles including multi-gigabit transceivers (MGTs) 401, CLBs 402, random access memory blocks (BRAMs) 403, input/output blocks (IOBs) 404, configuration and clocking logic (CONFIG/CLOCKS) 405, digital signal processing blocks (DSPs) 406, specialized input/output blocks (I/O) 407 (e.g., configuration ports and clock ports), and other programmable logic 408 such as digital clock managers, analog-to-digital converters, system monitoring logic, and so forth. Some FPGAs also include dedicated processor blocks (PROC) 410.

In some FPGAs, each programmable tile includes a programmable interconnect element (INT) 411 having standardized connections to and from a corresponding interconnect element in each adjacent tile. Therefore, the programmable interconnect elements taken together implement the programmable interconnect structure for the illustrated FPGA. The programmable interconnect element 411 also includes the connections to and from the programmable logic element within the same tile, as shown by the examples included at the top of FIG. 4.

For example, a CLB 402 may include a configurable logic element (CLE) 412 that may be programmed to implement user logic plus a single programmable interconnect element 411. A BRAM 403 may include a BRAM logic element (BRL) 413 in addition to one or more programmable interconnect elements. The BRAM comprises dedicated memory separate from the distributed RAM of a configuration logic block. Typically, the number of interconnect elements included in a tile depends on the height of the tile. In the pictured embodiment, a BRAM tile has the same height as four CLBs, but other numbers (e.g., five) may also be used. A DSP tile 406 may include a DSP logic element (DSPL) 414 in addition to an appropriate number of programmable interconnect elements. An IOB 404 may include, for example, two instances of an input/output logic element (IOL) 415 in addition to one instance of the programmable interconnect element 411. The location of connections of the device is controlled by configuration data bits of a configuration bitstream provided to the device for that purpose. The programmable interconnects, in response to bits of a configuration bitstream, enable connections comprising interconnect lines to be used to couple the various signals to the circuits implemented in programmable logic, or other circuits such as BRAMs or the processor.

In the pictured embodiment, a columnar area near the center of the die is used for configuration, clock, and other control logic. Horizontal areas 409 extending from this column are used to distribute the clocks and configuration signals across the breadth of the FPGA. Some FPGAs utilizing the architecture illustrated in FIG. 4 include additional logic blocks that disrupt the regular columnar structure making up a large part of the FPGA. The additional logic blocks may be programmable blocks and/or dedicated logic. For example, the processor block PROC 410 shown in FIG. 4 spans several columns of CLBs and BRAMs.

Note that FIG. 4 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 4 are purely exemplary. For example, in an actual FPGA more than one adjacent column of CLBs is typically included wherever the CLBs appear, to facilitate the efficient implementation of user logic.

Figure 5:
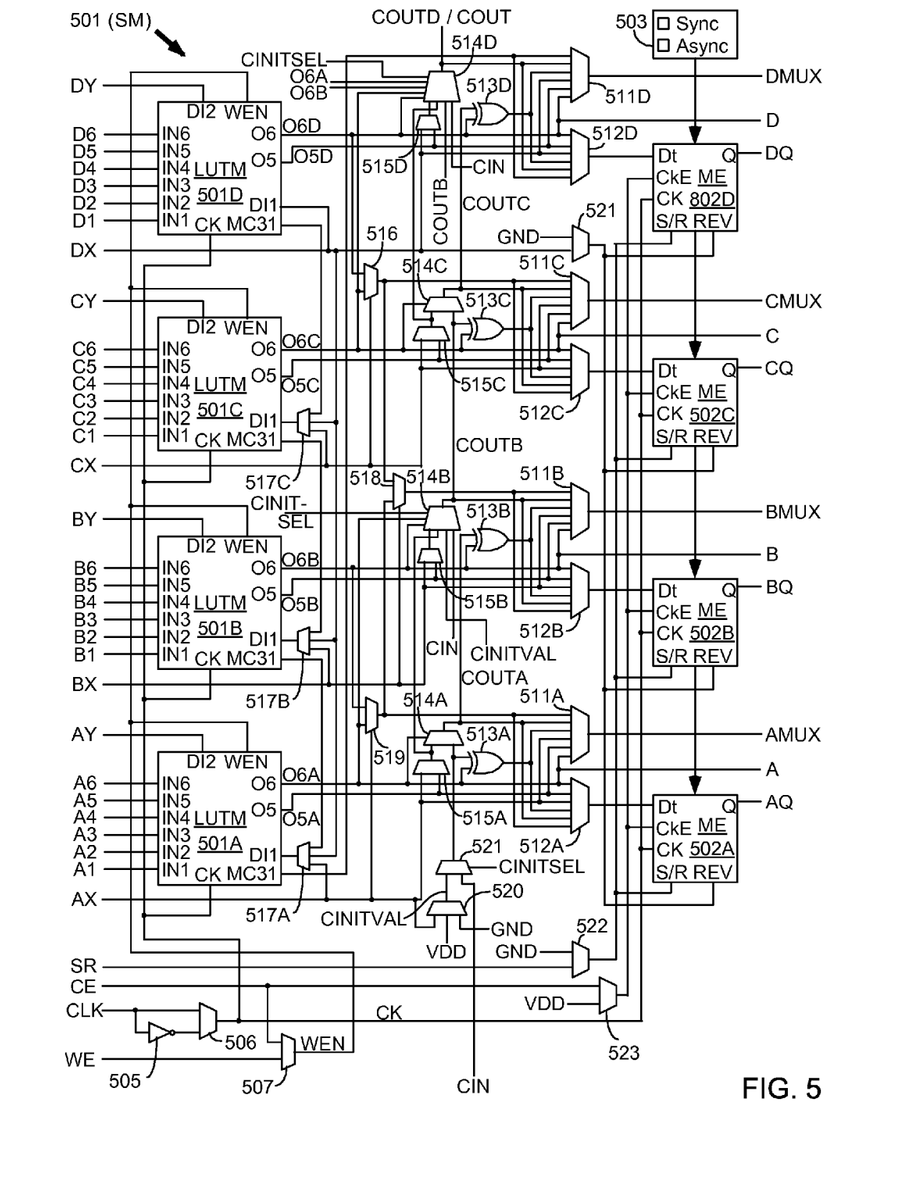
FIG. 5 is a block diagram of a configurable logic element of the device of FIG. 4 according to an embodiment of the present invention.

Turning now to FIG. 5, a block diagram of a configurable logic element of the device of FIG. 4 according to an embodiment of the present invention is shown. In particular, FIG. 5 illustrates in simplified form a configurable logic element of a configuration logic block 402 of FIG. 4. In the embodiment of FIG. 5, slice M 501 includes four lookup tables (LUTMs) 501A-501D, each driven by six LUT data input terminals A1-A6, B1-B6, C1-C6, and D1-D6 and each providing two LUT output signals O5 and O6. The O6 output terminals from LUTs 501A-501D drive slice output terminals A-D, respectively. The LUT data input signals are supplied by the FPGA interconnect structure via input multiplexers, which may be implemented by programmable interconnect element 511, and the LUT output signals are also supplied to the interconnect structure. Slice M also includes: output select multiplexers 511A-511D driving output terminals AMUX-DMUX; multiplexers 512A-512D driving the data input terminals of memory elements 502A-502D; combinational multiplexers 516, 518, and 519; bounce multiplexer circuits 522-523; a circuit represented by inverter 505 and multiplexer 506 (which together provide an optional inversion on the input clock path); and carry logic comprising multiplexers 514A-514D, 515A-515D, 520-521 and exclusive OR gates 513A-513D. All of these elements are coupled together as shown in FIG. 5. Where select inputs are not shown for the multiplexers illustrated in FIG. 5, the select inputs are controlled by configuration memory cells. That is, configuration bits of the configuration bitstream stored in configuration memory cells are coupled to the select inputs of the multiplexers to select the correct inputs to the multiplexers. These configuration memory cells, which are well known, are omitted from FIG. 5 for clarity, as well as from other selected figures herein.

In the pictured embodiment, each memory element 502A-502D may be programmed to function as a synchronous or asynchronous flip-flop or latch. The selection between synchronous and asynchronous functionality is made for all four memory elements in a slice by programming Sync/Asynch selection circuit 503. When a memory element is programmed so that the S/R (set/reset) input signal provides a set function, the REV input terminal provides the reset function. When the memory element is programmed so that the S/R input signal provides a reset function, the REV input terminal provides the set function. Memory elements 502A-502D are clocked by a clock signal CK, which may be provided by a global clock network or by the interconnect structure, for example. Such programmable memory elements are well known in the art of FPGA design. Each memory element 502A-502D provides a registered output signal AQ-DQ to the interconnect structure. Because each LUT 501A-501D provides two output signals, O5 and O6, the LUT may be configured to function as two 5-input LUTs with five shared input signals (IN1-IN5), or as one 6-input LUT having input signals IN1-IN6.

In the embodiment of FIG. 5, each LUTM 501A-501D may function in any of several modes. When in lookup table mode, each LUT has six data input signals IN1-IN6 that are supplied by the FPGA interconnect structure via input multiplexers. One of 64 data values is programmably selected from configuration memory cells based on the values of signals IN1-IN6. When in RAM mode, each LUT functions as a single 64-bit RAM or two 32-bit RAMs with shared addressing. The RAM write data is supplied to the 64-bit RAM via input terminal DI1 (via multiplexers 517A-517C for LUTs 501A-501C), or to the two 32-bit RAMs via input terminals DI1 and DI2. RAM write operations in the LUT RAMs are controlled by clock signal CK from multiplexer 506 and by write enable signal WEN from multiplexer 507, which may selectively pass either the clock enable signal CE or the write enable signal WE. In shift register mode, each LUT functions as two 16-bit shift registers, or with the two 16-bit shift registers coupled in series to create a single 32-bit shift register. The shift-in signals are provided via one or both of input terminals DI1 and DI2. The 16-bit and 32-bit shift out signals may be provided through the LUT output terminals, and the 32-bit shift out signal may also be provided more directly via LUT output terminal MC31. The 32-bit shift out signal MC31 of LUT 501A may also be provided to the general interconnect structure for shift register chaining, via output select multiplexer 511D and CLE output terminal DMUX.

Figure 6:
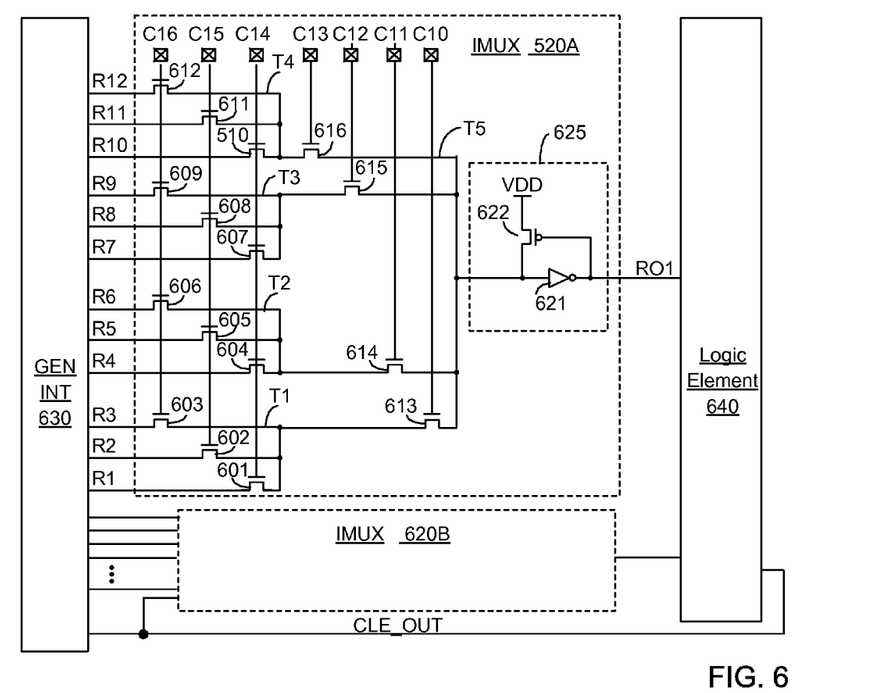
FIG. 6 is a block diagram of the programmable interconnects of the device of FIG. 4 according to an embodiment of the present invention.

Turning now to FIG. 6, a block diagram of the programmable interconnects of the device of FIG. 4 according to an embodiment of the present invention is shown. FIG. 6 illustrates how a programmable input multiplexer can be used to provide additional routing flexibility between the general interconnect structure and a configurable logic element. An input multiplexer provides the ability to select one of many different interconnect lines to provide a signal to a CLE input terminal. An input multiplexer can be implemented, for example, as shown in FIG. 6. The illustrated circuit selects one of several different input signals and passes the selected signal to an output terminal. Note that FIG. 6 illustrates an input multiplexer with twelve inputs, but PLD input multiplexers typically have many more inputs, e.g., 20, 24, 28, 30, 36, or some other number. However, FIG. 6 illustrates a smaller circuit, for clarity.

The circuit of FIG. 6 includes twelve input terminals R1-R12 and sixteen pass gates 601-616. Pass gates 601-603 selectively pass one of input signals R1-R3, respectively, to a first internal node T1. Each pass gate 601-603 has a gate terminal driven by a configuration memory cell C14-016, respectively. Similarly, pass gates 604-606 selectively pass one of input signals R4-R6, respectively, to a second internal node T2. Each pass gate 604-606 has a gate terminal driven by one of the same configuration memory cells C14-016, respectively. From internal nodes T1, T2, pass gates 613, 614 are controlled by configuration memory cells C10, C11, respectively, to selectively pass at most one signal to another internal node T5.

Pass gates 607-612 and 615-616 are similarly controlled by configuration memory cells C12-016 to select one of input signals R7-R12 and to pass the selected input signal via one of internal nodes T3, T4 to internal node T5, as shown in FIG. 6. The signal on internal node T5 is buffered by buffer 625 to provide output signal RO1. Buffer 625 includes an inverter 621 and a pull-up (e.g., a P-channel transistor 622 to power high VDD) on internal node T5 and driven by the output of inverter 621. Thus, values stored in configuration memory cells C10-C16 select at most one of the input signals R1-R12 to be passed to internal node T5, and hence to output node RO1. If none of the input signals is selected, output signal RO1 is held at its initial high value by pull-up 622.

Figure 7:
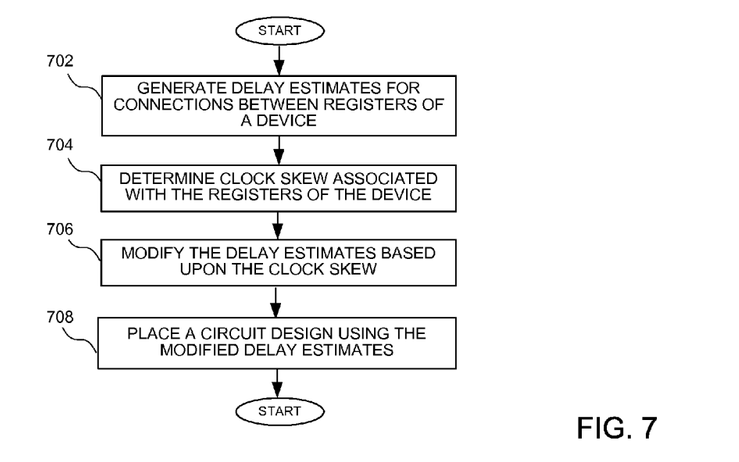
FIG. 7 is a flow chart showing a method of generating delay estimates for routing signals between registers according to an embodiment the present invention.

Turning now to FIG. 7, a flow chart shows a method of generating delay estimates for routing signals between registers according to an embodiment the present invention. In particular, delay estimates for connections between registers of a device are generated at a step 702. The delay estimates could be stored in Table 1 of the control circuit 102 of FIG. 1, for example. Clock skew associated with the registers of the device is determined at a step 704. The delay estimates are modified based upon the clock skew at a step 706 as described above in reference to FIG. 3. The modified delay estimates could be modified by the control circuit 102, and could be stored in the Table 2 of FIG. 1. A circuit design is placed using the modified delay estimates at a step 708. The placement of a circuit design in the step 708 is described in more detail in reference to FIG. 8

Figure 8:
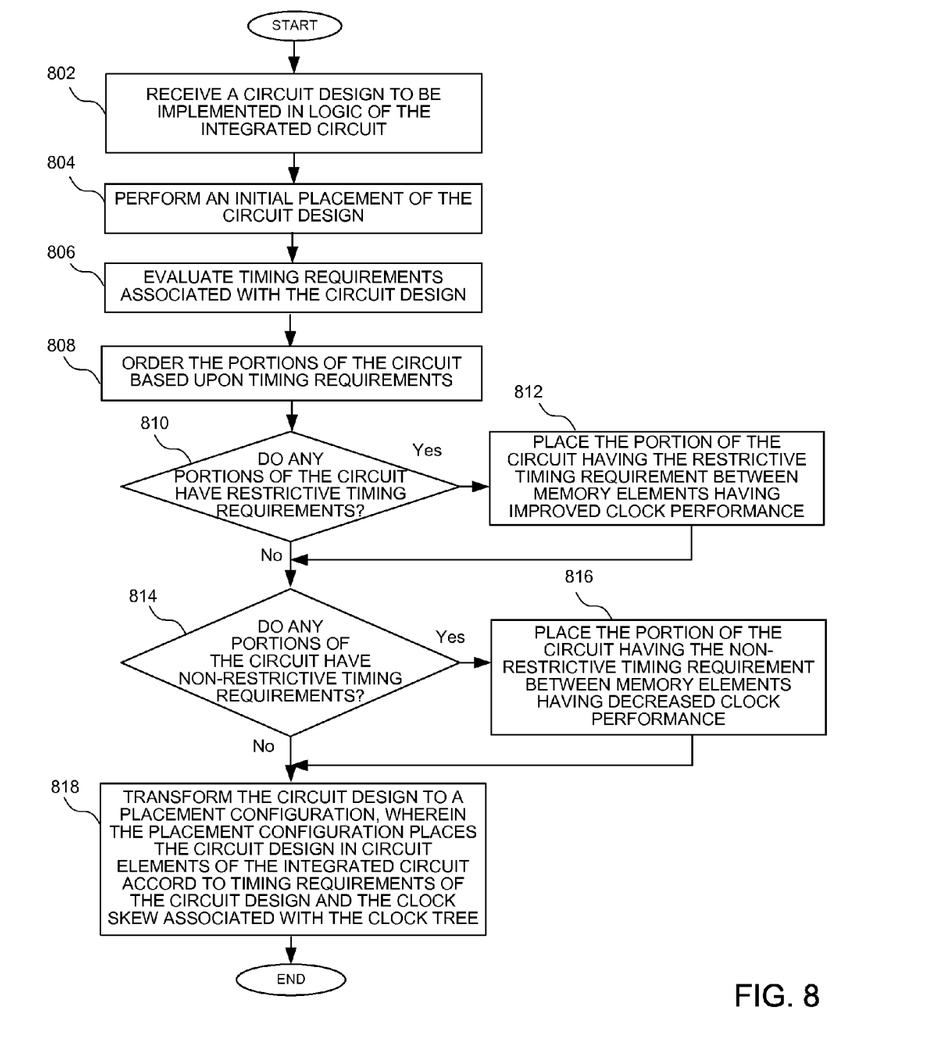
FIG. 8 is a flow chart showing a method of generating a logic configuration according to an embodiment the present invention.

Turning now to FIG. 8, a flow chart shows a method of generating a logic configuration according to an embodiment the present invention. In particular, a circuit design to be implemented in logic of the integrated circuit is received at a step 802. An initial placement of the circuit design is performed at a step 804. Timing requirements associated with the circuit design are evaluated at a step 806. The portions of the circuit are ordered based upon timing requirements at a step 808. It is then determined whether any portions of the circuit have restrictive timing requirements, such as a delay close to the clock period, at a step 810. If so, the portions of the circuit having the restrictive timing requirement are placed between memory elements having increased clock performance at a step 812. It is also determined whether any portions of the circuit have non-restrictive timing requirements at a step 814. The portions of the circuit having the non-restrictive timing requirement are placed between memory elements having decreased clock performance at a step 816. The circuit design is then transform to a placement configuration, wherein the placement configuration places the circuit design in circuit elements of the integrated circuit accord to timing requirements of the circuit design and the clock skew associated with the clock tree at a step 818. The methods of FIGS. 7 and 8 may be implemented using any of the circuits of FIGS. 1-6 as described above, or any other suitable circuits.

It can therefore be appreciated that the new and novel system for and method of generating a logic configuration for an integrated circuit has been described. It will be appreciated by those skilled in the art that numerous alternatives and equivalents will be seen to exist which incorporate the disclosed invention. As a result, the invention is not to be limited by the foregoing embodiments, but only by the following claims.

What is claimed is:

1. A method of placing a circuit design in circuit blocks of an integrated circuit, the method comprising:
receiving a circuit design to be implemented in the circuit blocks and memory elements of the integrated circuit, the circuit design receiving data and a clock signal;
determining clock skew for a clock tree providing the clock signal to the memory elements of the integrated circuit by determining a first delay of the clock signal to a first memory element and a second delay of the clock signal to a second memory element;
evaluating delay associated with data routed between the memory elements of the circuit design; and
transforming, by using a computer, the circuit design to a placement configuration by selecting portions of the circuit design to be placed between the first memory element and the second memory element, wherein the placement configuration places the circuit design in the circuit blocks of the integrated circuit according to the delay associated with data routed in a selected combinational path of one or more combinational paths between the memory elements of the circuit design and the first delay of the clock signal to the first memory element and the second delay of the clock signal to the second memory element.

2. The method of claim 1 further comprising generating delay estimates associated with the circuit blocks of the integrated circuit.

3. The method of claim 2 further comprising modifying the delay estimates based upon the clock skew for the clock tree.

4. The method of claim 1 wherein evaluating delay associated with the circuit design comprises identifying a portion of the circuit design having a restrictive timing requirement.

5. The method of claim 4 further comprising placing the portion of the circuit having the restrictive timing requirement between memory elements having increased clock performance.

6. A computer program product comprising:
a non-transitory computer-readable medium comprising computer-readable program code that transforms a circuit design to a placement configuration, the non-transitory computer-readable medium comprising:
computer-readable program code that receives a circuit design to be implemented in circuit blocks and memory elements of the integrated circuit, the circuit design receiving data and a clock signal;
computer-readable program code that determines clock skew for a clock tree providing the clock signal to the memory elements of the integrated circuit by determining a first delay of the clock signal to a first memory element and a second delay of the clock signal to a second memory element;
computer-readable program code that evaluates delay associated with data routed between the memory elements of the circuit design; and
computer-readable program code that transforms the circuit design to a placement configuration by selecting portions of the circuit design to be placed between the first memory element and the second memory element, wherein the placement configuration places the circuit design in the circuit blocks of the integrated circuit according to the delay associated with data routed in a selected combinational path of one or more combinational paths between the memory elements of the circuit design and the first delay of the clock signal to the first memory element and the second delay of the clock signal to the second memory element.

7. The computer program product of claim 6 further comprising computer-readable program code that generates delay estimates associated with the circuit blocks of the integrated circuit.

8. The computer program product of claim 7 further comprising computer-readable program code that modifies the delay estimates based upon the clock skew for the clock tree.

9. The computer program product of claim 6 further comprising computer-readable program code that identifies a portion of the circuit design having a restrictive timing requirement.

10. The computer program product of claim 9 further comprising computer-readable program code that places the portion of the circuit having the restrictive timing requirement placed between memory elements having improved clock performance.

11. A system for placing a circuit design in circuit blocks of an integrated circuit, the system comprising:
   an input coupled to receive a circuit design to be implemented in the circuit blocks of the integrated circuit;
   a memory storing delay associated with data routed between a first memory element and a second memory element;
   a control circuit coupled to transform the circuit design to a placement configuration, wherein the placement configuration places the circuit design in the circuit blocks including the first memory element and the second memory element of the integrated circuit according to the delay associated with data routed between the first memory element and the second memory element in a selected combinational path of one or more combinational paths between memory elements of portions of the circuit design and clock skew associated with the clock signal received by the first memory element and the second memory element of the integrated circuit; and
   an output coupled to receive the placement configuration.

12. The system of claim 11 wherein the placement configuration comprises the placement of lookup tables and interconnect elements between the memory elements of the integrated circuit.

13. The system of claim 11 further comprising a first table storing delay estimates associated with the circuit blocks of the integrated circuit.

14. The system of claim 13 further comprising a second table storing modified delay estimates associated with the circuit blocks of the integrated circuits.

15. The system of claim 11 further comprising a memory coupled to receive the output data.

16. The system of claim 11 further comprising a device having programmable logic coupled to receive the output data.

* * * * *